United States Patent
Schuhmacher et al.

(10) Patent No.: US 6,531,221 B1
(45) Date of Patent: Mar. 11, 2003

(54) MULTILAYER CHOLESTERIC PIGMENTS

(75) Inventors: Peter Schuhmacher, Mannheim (DE); Norbert Schneider, Altrip (DE); Raimund Schmid, Neustadt (DE); Wolfgang Best, Freinsheim (DE); Peter Blaschka, Ludwigshafen (DE); Frank Meyer, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/673,661

(22) PCT Filed: May 6, 1999

(86) PCT No.: PCT/EP99/03106

§ 371 (c)(1), (2), (4) Date: Nov. 6, 2000

(87) PCT Pub. No.: WO99/57223

PCT Pub. Date: Nov. 11, 1999

(30) Foreign Application Priority Data

May 6, 1998 (DE) .......................................... 198 20 225

(51) Int. Cl.[7] .................................................. B32B 5/16
(52) U.S. Cl. ...................... 428/402; 428/403; 428/407; 428/1.2; 428/1.3; 428/694 B
(58) Field of Search ...................... 428/1.2, 1.3, 694 R, 428/402, 403, 407

(56) References Cited

FOREIGN PATENT DOCUMENTS

| EP | 0 383 376 | 8/1990 |
| EP | 0383 376 B1 * | 8/1990 |
| WO | WO 94/22976 * | 10/1994 |

* cited by examiner

*Primary Examiner*—Leszek Kiliman
(74) *Attorney, Agent, or Firm*—Oblon, Spivak, McClelland, Maier & Neustadt, P.C.

(57) ABSTRACT

A platelet-shaped cholesteric multilayer pigment which comprises the layer sequence A/B/ and if desired C, where
  A and C independently of one another are at least one partly light-permeable absorption layer, and
  B is at least one cholesteric layer.

22 Claims, 1 Drawing Sheet

MULTILAYER CHOLESTERIC PIGMENTS

Figure 1:
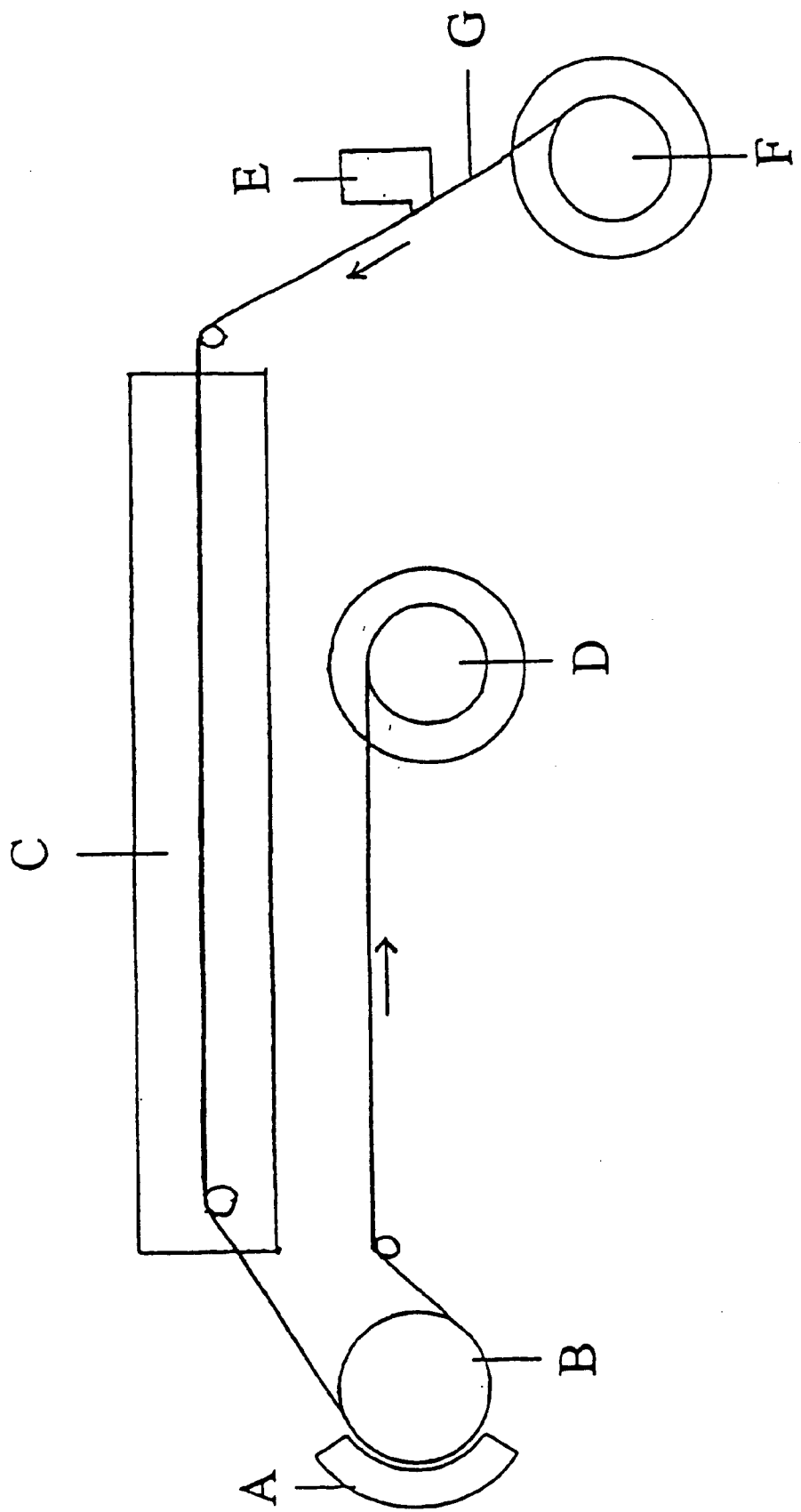

The invention relates to multilayer cholesteric pigments, to processes for their preparation and to their use.

When substances exhibiting shape anisotropy are heated it is possible for liquid-crystalline phases known as mesophases to occur. The individual phases differ in the spatial arrangement of the centers of mass of the molecules, on the one hand, and in the arrangement of the molecules with respect to the long axes, on the other hand. The nematic liquid-crystalline phase is distinguished by parallel orientation of the long axes of the molecules (one-dimensional order state). Provided that the molecules forming the nematic phase are chiral, the result is a chiral nematic (cholesteric) phase in which the long axes of the molecules form a helical superstructure perpendicular thereto. The chiral moiety may be present in the liquid-crystalline molecule itself or else may be added as a dopant to the nematic phase, inducing the chiral nematic phase. This phenomenon was first investigated on cholesterol derivatives.

The chiral nematic phase has special optical properties: a high optical rotation and a pronounced circular dichroism resulting from selective reflection of circularly polarized light within the chiral nematic layer. The colors appear different depending on the angle of view and depend on the pitch of the helical superstructure, which in turn depends on the twisting power of the chiral component. In this case, it is possible, in particular by altering the concentration of a chiral dopant, to vary the pitch and thus the wavelength range of the selectively reflected light of a chiral nematic layer. Chiral nematic systems of this type have interesting possibilities for practical use.

Cholesteric special-effect pigments and compositions comprising such pigments are known.

EP-B-383 376 describes liquid-crystal pigments comprising platelet-shaped carrier particles some of which at least are coated with liquid-crystalline material. Coating takes place by dispersing the platelet-shaped particles in a solvent in which liquid-crystalline material is dissolved, and then precipitating at least some of the liquid-crystalline material onto the particles. In the course of this the platelet-shaped carrier particles become fully or partly enveloped by the cholesteric. Uniform cholesteric layers arranged exactly parallel to the middle layer cannot be prepared by this process. The pigments are apparently not fully hiding, since they are said to be applied preferably to black surfaces.

DE-A-196 19 973 outlines, in a non-imitable manner, an idea for two- or three-layer platelet-shaped interference pigments. The pigments are intended to have at least one layer which consists of liquid-crystalline polymers whose mesogens are at least approximately in chiral-nematic and/or smectic and/or cholesteric order. Also provided in the interference pigments is a light-absorbing layer which is absorbent for at least part of the visible spectrum of light. The pigments are to be obtainable by knife coating, rolling or spray application to a smooth substrate, curing of the thin film thus produced, application of the light-absorbing layer, curing of this light-absorbing layer, optional application and curing of a further film which coincides with the first film in its composition and layer thickness, and removal and comminution of the cured layer assembly. Specific pigments, however, are not disclosed. As far as the material composition of the pigments is concerned, all that is said is that "liquid-crystalline main-chain or side-chain polymers or mixtures thereof, liquid-crystalline oligomers or oligomer mixtures, or liquid-crystalline monomers or monomer mixtures, [come] into consideration" as liquid-crystalline polymers. There are no examples regarding the preparation of the pigments or the pigment-containing coating formulations. The disclosure content of DE-A-196 19 973 is therefore limited to purely theoretical discussions of the idea of two- or three-layer pigments. Consequently, no technical teaching is provided that is imitable by the skilled worker.

WO 94/22976 describes two-layer cholesteric pigments based on two different polyorganosiloxanes from the company Wacker. The pigments are prepared in an extremely complex manner by separate coating of two previously nylon-coated glass plates with solutions of the abovementioned liquid crystals; rubbing of each liquid-crystal layer in order to orient it; attachment of thermally deformable spacers to the glass plates; placing of the glass plates together with their cholesteric layers facing one another, and uniting of the cholesteric layers by thermal deformation of the spacers at elevated temperature in a vacuum, and also crosslinking of the united cholesteric layers. The film thus obtainable is said, like the pigments obtainable from it by milling, to have a thickness of approximately $10 \mu m$. Despite the prior coating of the glass plates with nylon, detachment of the film from the glass plates is apparently incomplete, so that residues of the film have to be scratched off in order to obtain the pigments from the plates, which makes the preparation of the pigments even more complex. The idea of three-layer pigments is merely outlined. These pigments cannot be prepared by the preparation process described for two-layer pigments. WO 94/22976 therefore provides no technical teaching which is imitable by the skilled worker and which would in any way provide three-layer pigments. The disclosure content is limited to purely theoretical discussions of the structure of three-layer pigments.

The prior document DE-A-197 57 699 discloses plated-shaped cholesteric multilayer pigments having at least two cholesteric layers and at least one interlayer separating these cholesteric layers from one another and absorbing some or all of the light transmitted by the cholesteric layer. If this absorbing interlayer is made fully opaque, then given a sufficient level of pigmentation the perceived color of the pigment is entirely independent of the background, thereby making such pigments very highly suitable for use, for example, in automotive paints.

In order to absorb the transmitting wavelength range, other prior art cholesteric interference pigments must either contain additional pigments in the cholesteric matrix or be applied to a colored background. When foreign pigments are incorporated into the liquid-crystalline mass it is disadvantageous that a considerable portion of the reflecting wavelength range is absorbed or scattered by absorption and scattered light, so that the special advantage of the interference pigments on a cholesteric basis is largely removed. The same problem occurs if cholesteric pigments are mixed with absorbing pigments into coating formulations. Reflections which disrupt the perceived color can only be avoided if the absorbing pigment is dispersed very finely into the cholesteric matrix. From general experience this is only the case if the pigment is dispersed using additives tailored specifically to the pigment surface. These compounds, such as fatty acids, salts of fatty acids, soya lecithins or phosphates, however, interfere with the development of the helical orientation and this prevents optimum color development. If, on the other hand, absorption takes place over a colored underlayer, the background must be of uniformly high quality in order to provide the desired overall impression of the effect coating. Consequently, considerable effort has to be expended on pretreating the background. An ideal background for maximum brilliance would have to be black or have specular gloss, which in the case of car bodies, for example, would be extremely difficult to realize.

It is an object of the present invention to provide special-effect pigments which no longer have the above-described disadvantages of the prior art.

We have found that this object is achieved by a multilayer pigment which comprises at least one partly light-permeable layer, below that at least one cholesteric layer and, if desired, below that, at least one further partly light-permeable layer.

The present invention therefore provides a platelet-shaped cholesteric multilayer pigment which comprises the layer sequence A/B/ and if desired C,
where
A and C independently of one another are at least one partly light-permeable absorption layer, and
B is at least one cholesteric layer.

The multilayer pigment of the invention offers a range of surprising advantages:

a) A and/or C can be applied very thinly, so that the pigments have a more favorable diameter-thickness ratio than LC pigments of the prior art.

b) The thin pigment platelets can be aligned more readily, especially in an automotive basecoat, than LC pigments of the prior art.

c) The pigments are more lustrous than the LC pigments of the prior art, so that in an automotive finish, for example, less clearcoat need be applied to the basecoat film.

d) The opacity of the pigments is equal or superior to that of prior art pigments, since substantially more pigments particles of the invention can be employed per unit volume of paint.

e) The use of semitransparent pigments permits coating systems with a depth effect, which exhibit a pearlescent shimmer.

f) A and/or C can have the same or different coloration, which allows for numerous combinations of interference colors and absorption colors. For example, layers A and/or C absorbing in the blue wavelength range can cut out blue shades from an angle-dependent color play of the layer B.

A and/or C comprise preferably absorbing colorants. These can be present in pigmentary form or in solution as a dye in an organic or inorganic binder matrix. The absorption pigment can be an overcolored white pigment, a color pigment or, preferably, a black pigment. Suitable pigments are nonabsorbing pigments (white pigments) which have been mixed with absorbing colorants (dyes or colored pigments), examples being $TiO_2$, $ZrO_2$, $Al_2O_3$, $SiO_2$, ZnO and $SnO_2$. Preference is given to employing selectively or nonselectively absorbing pigments. Among selectively absorbing pigments particular mention may be made of iron oxides, chromates, vanadates and sulfides; among those which are nonselectively absorbing, black $Fe_3O_4$ (magnetite) and carbon black.

Examples of suitable organic absorption pigments are azo pigments, metal complex pigments, such as azo- and azomethine-metal complexes, isoindolinone and isoindoline pigments, phthalocyanine pigments, quinacridone pigments, perinone and perylene pigments, anthraquinone pigments, diketopyrrolopyrrole pigments, thioindigo pigments, dioxazine pigments, triphenylmethane pigments, quinophthalone pigments and fluorescent pigments.

Particularly suitable absorption pigments are fine such pigments having an average particle size of from 0.01 to 1 µm, preferably from 0.01 to 0.1 µm.

It is preferably possible to employ various grades of carbon black, especially readily dispersible pigment-grade carbon blacks having a specific surface area of from 30 to 150 $m^2$/g (BET method) and an absorption capacity of from 50 to 100 ml of dibutyl phthalate/100 g (DBP number).

Suitable absorption pigments also include those which impart magnetic properties to A and/or C. Suitable examples are γ-$Fe_2O_3$, $Fe_3O_4$, $CrO_2$ or ferromagnetic metal pigments, such as Fe, Fe—Cu and Fe—Ni—Co alloys, for example.

Absorption dyes which may be present in A and/or C are, in principle, always selectively or nonselectively absorbing dyes which are soluble in the organic or inorganic binders employable in accordance with the invention and which do not adversely affect the properties of the layer in which they are present. Examples of suitable dyes are monoazo dyes and their metal salts, disazo dyes, condensed disazo dyes, isoindoline derivatives, derivatives of naphthalene- or perylenetetracarboxylic acid, anthraquinone dyes, thioindigo derivatives, azomethine derivatives, quinacridones, dioxazines, pyrazoloquinazolones, phthalocyanine dyes or basic dyes such as triarylmethane dyes and salts thereof.

The absorption pigments or dyes are preferably bound into, or dissolved in, an organic binder matrix. Employable binders are the customary coatings systems. Suitable systems are preferably radiation-curable systems comprising reactive, crosslinkable groups, such as acrylic, methacrylic, α-chloroacrylic, vinyl, vinyl ether, epoxy, cyanate, isocyanate or isothiocyanate groups.

Other binders which can be employed are monomeric agents and mixtures thereof with polymeric binders. Preferred monomeric agents are those which have two or more crosslinkable groups, such as acrylic, methacrylic, α-chloroacrylic, vinyl, vinyl ether, epoxy, cyanate, isocyanate or isothiocyanate groups. Particular preference is given to acrylic, methacrylic or vinyl ether groups. Examples of monomeric agents having two crosslinkable groups are the diacrylates, the divinyl ethers or the dimethacrylates of diols such as propanediol, butanediol, hexanediol, ethylene glycol, diethylene glycol, triethylene glycol or tetrapropylene glycol, for example.

Examples of monomeric agents having three crosslinkable groups are the triacrylates, the trivinyl ethers or the trimethacrylates of triols such as trimethylolpropane, ethoxylated trimethylolpropane having 1 to 20 ethylene oxide units, propoxylated trimethylolpropane having 1 to 20 propylene oxide units, and mixed ethoxylated and propoxylated trimethylolpropane in which the sum of ethylene oxide and propylene oxide units is from 1 to 20. Examples of monomeric agents having three crosslinkable groups are also the triacrylates the trivinyl ethers or the trimethacrylates of glycerol, ethoxylated glycerol having 1 to 20 ethylene oxide units, propoxylated glycerol having 1 to 20 propylene oxide units, and mixed ethoxylated and propoxylated glycerol in which the sum of ethylene oxide and propylene oxide units is from 1 to 20.

Examples of monomeric agents having four crosslinkable groups are the tetraacrylates, the tetravinyl ethers or the tetramethacrylates of tetraols such as bis-trimethylolpropane, ethoxylated bis-trimethylolpropane having 1 to 20 ethylene oxide units, propoxylated bis-trimethylolpropane having 1 to 20 propylene oxide units, and mixed ethoxylated and propoxylated bis-trimethylolpropane, in which the sum of ethylene oxide and propylene oxide units is from 1 to 20. Further examples of monomeric agents having four crosslinkable groups are the tetraacrylates, the tetravinyl ethers or the tetramethacrylates of tetraols such as pentaerythritol, ethoxylated pentaerythritol having 1 to 20 ethylene oxide units, propoxylated pentaerythritol having 1 to 20 propylene oxide units, and mixed ethoxylated and propoxylated pentaerythritol in which the sum of ethylene oxide and propylene oxide units is from 1 to 20.

To enhance the reactivity in the course of crosslinking or polymerization in air it is possible for the binders and the monomeric agents to include from 0.1 to 10% of a primary or secondary amine. Examples of suitable amines are ethanolamine, diethanolamine or dibutylamine.

A suitable inorganic binder which may be present in A and/or C is, for example, $SiO_2$, which can be applied in the form of waterglass or silanes.

The absorption pigments and/or dyes are preferably stirred into a melt or solution of the inorganic binder or are admixed in another customary manner. The pigmented or dye-containing binder is applied as described later on below.

With particular preference, the absorption pigments or dyes of A and/or C are bound into or dissolved in a binder matrix which comprises the cholesteric mixtures that are described further below as ingredients of B. With very particular preference, the binder matrix of A and/or C comprises the same cholesteric mixtures as B.

The absorption pigment formulation can be prepared by the customary dispersion techniques, which are known in the art, and using diluents, dispersants, photoinitiators and, if desired, further additives.

The absorption dye of the formulation can be prepared in a known manner by dissolving the dye in one of the above-mentioned binders or in a binder mixture with or without the use of diluents, photoinitiators and further additives.

Diluents which can be used are water or organic liquids or mixtures thereof, preference being given to organic liquids. Particularly preferred organic liquids are those having a boiling point of below 140° C., especially ethers such as tetrahydrofuran, ketones such as ethyl methyl ketone and esters such as butyl acetate.

Dispersants which can be used are low molecular mass dispersants such as stearic acid, for example, or else polymeric dispersants. Suitable polymeric dispersants or dispersing resins are known to the skilled worker. Mention may be made in particular of polyurethanes containing sulfonate, phosphonate or carboxyl groups, vinyl chloride copolymers containing carboxyl groups, polyimine polyesters or polyether acrylates, with or without functional groups incorporated. One group of preferred dispersants is known, for example, from DE-A-195 16 784 or from EP-A-0 742 238, which are expressly incorporated herein by reference.

For the preparation of crosslinkable or polymerizable absorption pigment formulations it is possible to use the photoinitiators customary for photochemical polymerization, examples being the photoinitiators listed below for the photochemical polymerization of the cholesteric mixtures.

In another preferred embodiment of the present invention, A and/or C contain a preferably crosslinked polymer which shows selective or nonselective absorption for light. Examples of nonselectively absorbing polymers are black polymers, such as polypyrrole. Examples of selectively absorbing polymers are colored polymers. The absorbing polymers can comprise the above-mentioned absorption pigments or absorption dyes in dispersed form or in dissolved form, respectively, in order to vary or intensify the desired absorption effect. The absorbing polymers can also include chromophores attached covalently to the polymer.

Another preferred embodiment of the present invention is a multilayer pigment where A and/or C comprise at least one essentially inorganic, light-absorbing absorption layer. For the purposes of the present invention a layer is defined as essentially inorganic if it comprises organic compounds (carbon compounds) merely as impurities ($\leq 5\%$ by weight). The inorganic absorption layer can comprise both selectively or nonselectively absorbing substances of high refractive index or else nonselectively absorbing substances which are of low refractive index but have a high absorption constant and which, of course, must also be able to be deposited in a permanent, filmlike manner. Such substances are described, for example, in EP-A-753 545, the full content of which is incorporated herein by reference.

Examples of materials of high refractive index suitable for A and/or C are nonselectively absorbing materials, such as metals, metal oxides, metal sulfides and mixtures thereof, which may also comprise selectively absorbing metal oxides in minor amounts, and selectively absorbing materials, such as metal oxides in particular, which generally have in each case a refractive index n>2.0, preferably n>2.4.

Specifically, the following materials may be mentioned as examples of nonselectively absorbing materials of high refractive index that are suitable for A and/or C:

materials which can be applied by gas-phase decomposition of volatile metal compounds, such as molybdenum, iron, tungsten, chromium, cobalt and nickel, and mixtures of these metals; metals which can be deposited by wet-chemical means, through reduction from metal salt solutions, such as silver, copper, gold, palladium and platinum, and also cobalt and nickel and alloys such as NiP, NiB, NiCo, NiWP, CoP and AgAu;

metal oxides, such as magnetite $Fe_3O_4$, cobalt oxide (CoO, $Co_3O_4$) and vanadium oxide ($VO_2$, $V_2O_3$), and also mixtures of these oxides with the metals, such as magnetite and iron in particular;

metal sulfides, such as molybdenum sulfide, iron sulfide, tungsten sulfide, chromium sulfide, cobalt sulfide and nickel sulfide, and mixtures of these sulfides such as $MoS_2/WS_2$, and also, in particular, mixtures of these sulfides with the respective metal, such as in particular $MoS_2$ and molybdenum, and mixtures with oxides of the respective metal, such as $MoS_2$ and molybdenum oxides.

Also suitable as nonselectively absorbing absorption layers of high refractive index, for example, are layers of colorless materials of high refractive index, such as zirconium dioxide and, in particular, titanium dioxide, into which nonselectively absorbing (black) material (e.g. carbon) is incorporated, or which are coated with said material.

Examples of selectively absorbing materials of high refractive index are especially colored oxides such as preferably iron(II) oxide (α- and γ-$Fe_2O_3$, red), chromium(III) oxide (green), titanium(III) oxide ($Ti_2O_3$, blue) and vanadium pentoxide (orange), and also colored nitrides, such as preferably titanium oxynitride and titanium nitride ($TiO_xN_y$, TiN, blue), the lower titanium dioxides and titanium nitrides generally being present as a mixture with titanium dioxide.

It is of course also possible here to use colorless materials of high refractive index, examples being metal oxides such as zirconium oxide and especially titanium oxide, which are colored with selectively absorbing colorants, something which may be effected by incorporating colorants into the metal oxide layer, by doping thereof with selectively absorbing metal cations, or by overcoating the metal oxide layer with a film comprising a colorant.

Finally, suitable nonselectively absorbing materials of low refractive index with high absorption constants for A and/or C are, in particular, metals such as aluminum.

The coating should not be opaque but should be at least partly permeable to visible light (semitransparent) and is, therefore, of varying thickness depending on the optical properties of the selected layer materials.

The thickness of the individual layers of A and/or C when using inorganic absorption layers for nonselectively absorbing materials of high refractive index, such as metals, black metal oxides and sulfides, is generally from 1 to 100 nm, with preference being given, for strongly absorbing metals, such as molybdenum and chromium, to layer thicknesses of from about 1 to 25 nm, for less strongly absorbing materials, such as magnetite, to layer thicknesses of from about 10 to 50 nm, and, for metal sulfide-containing materials, such as layers containing $MoS_2$, to layer thicknesses of from 5 to 20 nm.

When using absorption pigments or absorbing polymers, the thickness of each individual layer of A and/or C is from about 1 nm to 5 μm, in particular from about 5 nm to 3 μm, for example from about 5 to 700 nm or from 5 to 500 nm or from 5 to 300 nm.

A and C may also be identical or different in terms of their mechanical properties. They may, for example, differ in thickness or brittleness.

Preferably, the thickness of each individual cholesteric layer of B is from about 0.5 to 20 μm, in particular from about 1 to 10 μm and, with particular preference, from about 2 to 4 μm or from 1 to 2.5 μm or from 1 to 1.5 μm.

The diameter of the pigments of the invention is from about 3 to 500 μm, in particular from about 3 to 100 μm or from 10 to 100 μm and, with particular preference, from about 3 to 30 μm. In general, the pigment diameter is approximately from 5 to 20 times the pigment thickness.

The total thickness of the multilayer pigments of the invention is, for example, less than about 30 μm, or less than about 20 μm or less than about 10 μm, such as, for example, from about 1 to 5 μm or from 1 to 3 μm.

Advantageously, the adhesion between cholesteric layer B and absorption layers A and/or C is chosen so that there is essentially no delamination when the layer assembly is ground to the pigment. The adhesive force between cholesteric layer and absorption layer is judiciously more than about 8 cN, in particular more than about 12 cN, such as, for example, from about 15 to 30 cN or from 18 to 25 cN. The determination of the adhesive force is described in more detail in the experimental section.

Suitable in accordance with the invention are also pigments whose absorption layer(s) A and/or C are magnetic. Such pigments can, advantageously, be given an arbitrary orientation by application of a magnetic field. In this way it is possible, for instance, to prevent individual pigment platelets projecting from the others, which results in the scattering of less light and an improvement in the perceived color. All of the platelets can be oriented together in a defined angle. It is also possible to generate full-area patterns in order to obtain new color effects, or partial patterns for optical emphasis of indicia or structures. The magnetic cholesteric pigments of the invention can also be employed with advantage in a liquid matrix, for example in LCDs, where they alter their alignment and therefore their perceived color when a magnetic field is applied.

The layer assembly B of the pigments of the invention preferably comprises cholesteric mixtures selected from a) at least one cholesteric, polymerizable monomer;

b) at least one achiral, nematic, polymerizable monomer and one chiral compound;

c) at least one cholesteric, crosslinkable polymer; or d) a cholesteric polymer in a polymerizable diluent;

e) at least one cholesteric polymer whose cholesteric phase can be frozen in by rapid cooling to below the glass transition temperature, in the cured state.

Curing fixes the uniform orientation of the cholesteric molecules in the cholesteric layer.

Preferred monomers of group a) are described in DE-A-196 02 848, the full content of which is incorporated herein by reference. In particular, the monomers a) embrace at least one chiral, liquid-crystalline, polymerizable monomer of the formula I

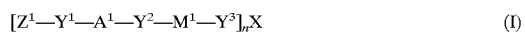

where $Z^1$ is a polymerizable group or a radical which carries a polymerizable group, $Y^1$, $Y^2$, $Y^3$ independently are chemical bonds, oxygen, sulfur, —CO—O—, —O—CO—, —O—CO—O—, —CO—N(R)— or —N(R)—CO—, $A^1$ is a spacer, $M^1$ is a mesogenic group, X is an n-valent chiral radical, R is hydrogen or $C_1$–$C_4$-alkyl, n is 1 to 6, and $Z^1$, $Y^1$, $Y^2$, $Y^3$, $A^1$ and $M^1$ can be identical or different if n is greater than 1.

As preferred monomers of group b), the cholesteric mixture in the process of the invention includes at least one achiral liquid-crystalline polymerizable monomer of the formula II

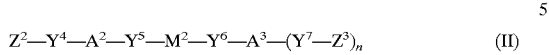

Z²—Y⁴—A²—Y⁵—M²—Y⁶—A³—(Y⁷—Z³)$_n$   (II)

where $Z^2$, $Z^3$ are identical or different polymerizable groups or radicals which contain a polymerizable group, n is 0 or 1, $Y^4$, $Y^5$, $Y^6$, $Y^7$ independently are chemical bonds, oxygen, sulfur, —CO—O—, —O—CO—, —O—CO—O—, —CO—N(R)— or —N(R)—CO—, $A^2$, $A^3$ are identical or different spacers and $M^2$ is a mesogenic group.

In addition, the mixture of group b) includes a chiral compound. The chiral compound brings about the twisting of the achiral liquid-crystalline phase to form a cholesteric phase. In this context, the extent of twisting depends on the twisting power of the chiral dopant and on its concentration. Consequently, therefore, the pitch of the helix and, in turn, the interference color depend on the concentration of the chiral dopant. As a result, it is not possible to indicate a generally valid concentration range for the dopant. The dopant is added in the amount at which the desired color effect is produced.

Preferred chiral compounds combinable with the achiral compounds of the formula II are those of the formula Ia

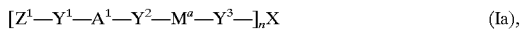

[Z¹—Y¹—A¹—Y²—M$^a$—Y³—]$_n$X   (Ia), where $Z^1$, $Y^1$, $Y^2$, $Y^3$, $A^1$, X and n are as defined above and $M^a$ is a divalent radical which comprises at least one heterocyclic or isocyclic ring system.

The moiety $M^a$ here is similar to the mesogenic groups described, since in this way particularly good compatibility with the liquid-crystalline compound is achieved. $M^a$, however, need not be mesogenic, since the compound Ia is intended merely by means of its chiral structure to bring about the appropriate twisting of the liquid-crystalline phase. Further monomers and chiral compounds of group b) are described in WO 97/00600 and its parent DE-A-195 324 08, the full content of which is expressly incorporated herein by reference.

Preferred polymers of group c) are cholesteric cellulose derivatives as described in DE-A-197 136 38, especially cholesteric mixed esters of (VI) hydroxyalkyl ethers of cellulose with (VII) saturated, aliphatic or aromatic carboxylic acids and (VIII) unsaturated mono- or dicarboxylic acids.

It is also possible to use crosslinkable oligosiloxanes or polysiloxanes as are described, for example, in EP-A-0 358 208, DE-A-195 41 820 and DE-A-196 19 460.

Highly suitable polymers of group c), moreover, are the propargyl-terminated cholesteric polyesters or polycarbonates described in DE-A-197 17 371.

Further suitable polymers of group c) are cholesteric polycarbonates containing photoreactive groups even in a nonterminal position. Such polycarbonates are described in DE-A-196 31 658.

Suitable polymers of group e) are chiral nematic polyesters having flexible chains and comprising isosorbide, isomannide and/or isoidide units, preferably isosorbide units, and also comprising at least one chain-flexibilizing unit selected from (and derived from)

(a) aliphatic dicarboxylic acids, (b) aromatic dicarboxylic acids with a flexible spacer, (c) α,ω-alkanoids, (d) diphenols with a flexible spacer, and (e) condensation products of a polyalkylene terephthalate or polyalkylene naphthalate with an acylated diphenol and with an acylated isosorbide, as are described in DE-A-197 04 506.

The polyesters are noncrystalline and form stable Grandjean textures which can be frozen in on cooling to below the glass transition temperature. The glass transition temperatures of the polyesters are in turn, despite the flexibilization, above 80° C., preferably above 90° C. and, in particular, above 100° C.

Examples of preferred polymers of group d) are crosslinkable cholesteric copolyisocyanates as described in U.S. Pat. No. 08,834,745.

Very particular preference is given, in accordance with the invention, to the presence in layer B of chiral compounds and nematic monomers of group b), especially of chiral compounds of the formula 2:

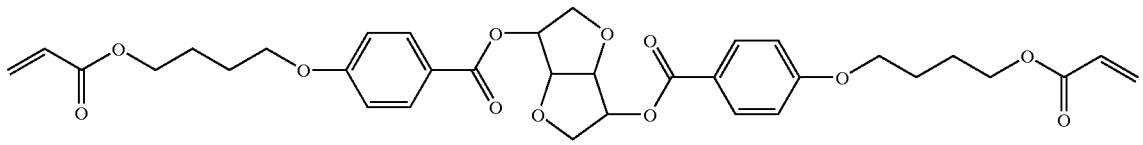

(2)

or of the formula 5:

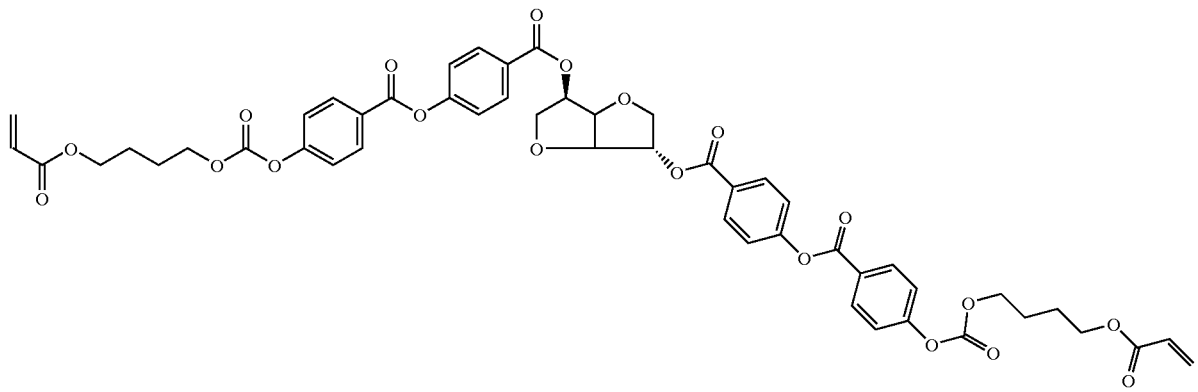

and nematic monomers of the formula 1:

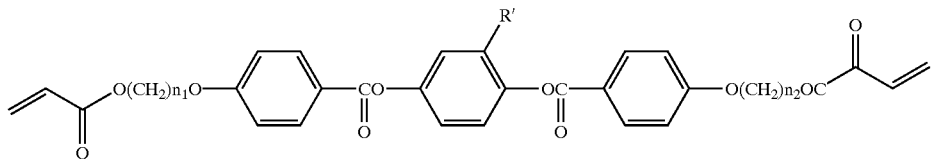

or preferably of the formula 3:

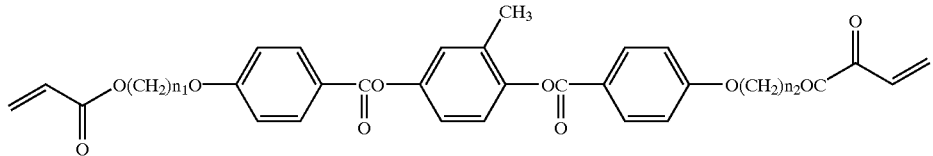

or with particular preference of the formula 4:

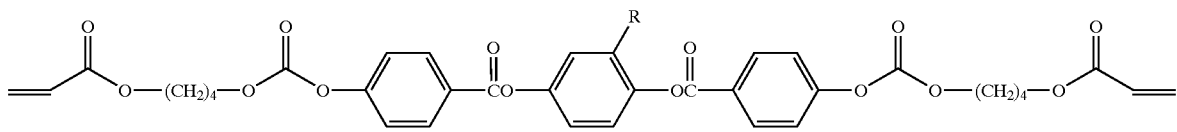

in the cured state, where $n_1$ and $n_2$ in formulae 1 and 3 are independently 4 or 6, R' in formula I is H or Cl, and the monomers of the formula 1 or 3 are preferably employed as mixtures of the compounds with $n_1/n_2$=4/4, 4/6, 6/4 or 6/6, and R in formula 4 is H, Cl or $CH_3$. It is also possible in accordance with the invention, however, for other cholesteric mixtures, examples being the mixtures disclosed in EP-A-686 674, to be present in the cured state in B.

The cholesteric mixtures, and the formulations comprising absorption pigment, can be diluted with any suitable diluent before being applied to the carrier.

Diluents which can be employed in the process of the invention for the compounds of the groups a) and b) are linear or branched esters, especially acetic esters, cyclic ethers and esters, alcohols, lactones, aliphatic and aromatic hydrocarbons, such as toluene, xylene and cyclohexane, and also ketones, amides, N-alkylpyrrolidones, especially N-methylpyrrolidone, and in particular tetrahydrofuran (THF), dioxane and methyl ethyl ketone (MEK).

Examples of suitable diluents for the polymers of group c) are ethers and cyclic ethers, such as tetrahydrofuran or dioxane, chlorinated hydrocarbons, such as dichloromethane, 1,1,2,2-tetrachloroethane, 1-chloronaphthalene, chlorobenzene or 1,2-dichlorobenzene. These diluents are particularly suitable for polyesters and polycarbonates. Examples of suitable diluents for cellulose derivatives are ethers, such as dioxane, or ketones, such as acetone. If copolyisocyanates are employed as polymers of group d) it is advisable to use polymerizable diluents as described in U.S. Pat. No. 8,834,745.

The mixtures of groups a), b) or c) may also include, in small amounts, polymerizable diluents in addition to the inert diluent. Preferred polymerizable solvents which can be added to a), b) or c) are acrylates, especially acrylates of relatively high functionality such as bis-, tris- or tetraacrylates, and with particular preference high-boiling oligoacrylates. The preferred amount added is approximately 5% by weight, based on the overall weight of the mixture.

For photochemical polymerization, the cholesteric mixture may include customary commercial photoinitiators. For curing by electron beams, such initiators are not required. Examples of suitable photoinitiators are isobutyl benzoin ether, 2,4,6-trimethylbenzoyldiphenylphosphine oxide, 1-hydroxycyclohexyl phenyl ketone, 2-benzyl-2-dimethylamino-l-(4-morpholinophenyl)furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]-phenyl)-2-(4-morpholinyl)-1-propanone, 2-hydroxy-2-methyl-1-phenylpropan-l-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bisdimethylaminobenzophenone, ($\eta^5$-cyclopentadienyl)($\eta^6$-isopropylphenyl)iron(II) hexafluorophosphate, triphenylsulfonium hexafluorophosphate or mixtures of triphenylsulfonium salts, and also butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

The brightness of the cholesteric layer(s) B can be increased by adding small amounts of suitable leveling agents. It is possible to employ from about 0.005 to 1% by weight, in particular from 0.01 to 0.5% by weight, based on the amount of cholesteric employed. Examples of suitable leveling agents are glycols, silicone oils and, in particular, acrylate polymers, such as the acrylate copolymers obtainable under the name Byk 361 or Byk 358 from Byk-Chemie and the modified, silicone-free acrylate polymers obtainable under the name Tego flow ZFS 460 from Tego.

Preferably, A and/or C and if desired B also include, in amounts from about 0.1 to 10% by weight, stabilizers to counter the effects of UV and weather. Examples of suitable such additives are derivatives of 2,4-dihydroxybenzophenone, derivatives of 2-cyano-3,3-diphenyl acrylate, derivatives of 2,2',4,4'-tetrahydroxybenzophenone, derivatives of ortho-hydroxyphenylbenzotriazole, salicylic esters, orthohydroxyphenyl-S-triazines or sterically hindered amines. These substances can be employed alone or, preferably, as mixtures.

The present invention additionally provides a process for producing a pigment of the invention, which comprises applying the layers A, B and if desired C atop one another to a substrate, simultaneously or with a time differential, curing the layers by heat, UV radiation, electron beams or by rapid cooling to below the glass transition temperature, again simultaneously or with a time differential, removing the layers together from the substrate, and then comminuting them to give pigments.

The application of the layers A, B and if desired C to the substrate can be carried out by means of customary techniques selected, for example, from air-knife coating, knife coating, air blade coating, squeeze coating, impregnation, reverse roll coating, transfer roll coating, gravure coating, kiss coating, casting, spray coating, spin coating or printing techniques, such as letterpress (relief), intaglio, flexographic, offset or screen printing. The layers A, B and if desired C are preferably applied to the substrate by means of casting or offset printing.

If A and/or C comprise an essentially inorganic absorption layer, it can be applied by means of physical vapor deposition (PVD) or, in particular, by means of chemical vapor deposition (CVD) or by means of wet-chemical precipitation methods. Where A and/or C include not only the inorganic absorption layer but also further layers—for example, layers comprising colored polymer or pigmented or dye-containing absorption layers—the inorganic absorption layer can be applied prior to or following the application of these other layers.

The present invention additionally provides a platelet-shaped cholesteric multilayer pigment which comprises at least one cholesteric layer B enveloped by at least one partly light-permeable absorption layer A, with A being essentially inorganic and B being composed as described above. The present invention additionally provides a process for preparing such a multilayered pigment, which comprises first applying layer B to a substrate, curing it, removing the cured layer from the substrate, comminuting it to form pigments, and then applying layer A to the pigments.

The application of the essentially inorganic layers A and/or C can be carried out, for example, by wet chemical means or by means of CVD, with the coating conditions being chosen so as not to damage B.

Metallic layers A and/or C are preferably applied by decomposition of metal carbonyls such as iron pentacarbonyl, chromium, molybdenum or tungsten hexacarbonyl, nickel tetracarbonyl and/or dicobalt octacarbonyl at from 70 to 300° C. under inert conditions. For the decomposition of Mo(CO)$_6$, which is particularly preferred, suitable temperatures in this case are in particular from 200 to 250° C.

For conducting the CVD variant it is advisable, as generally for CVD techniques, to use a fluidized-bed reactor. The pigments, composed of one layer or a plurality of layers B, are heated in the reactor to the desired reaction temperature (generally from 100 to 300° C., preferably from 150 to 200° C.) with fluidization using an inert fluidizing gas, such as nitrogen.

Aluminum layers A and/or C can be deposited by means of inert gas-phase decomposition of aluminum organyls, especially aluminum alkyls or alkylamine adducts of aluminum hydrides.

Suitable aluminum alkyls are not only monoalkylaluminum hydrides and halides but also, preferably, dialkylaluminum hydrides and halides, and, in particular, aluminum trialkyls, such as triethyl- and trimethylaluminum in particular.

In terms of the process, the procedure when applying the aluminum layers A and/or C is judiciously such that the aluminum alkyl as a solution in a relatively nonvolatile hydrocarbon, such as petroleum, is charged to an evaporator vessel, which is located upstream of the coating reactor and is heated in stages to about 100–150° C., then transferred into the reactor with the aid of a stream of inert gas (e.g., argon or, in particular, nitrogen) which is passed through this solution, transfer taking place by way of a preferably thermally conditioned nozzle, and in the reactor is subjected to thermal decomposition at generally from 100 to 300° C., preferably from 150 to 400° C.; in general, the amount of gas of the volatile aluminum compound should not be more than 2% by volume, preferably not more than 1% by volume, of the overall amount in the reactor.

As the reactor, particular preference is given to the above-mentioned fluidized-bed reactor, although it is also possible to use a single-necked round-bottomed flask made of quartz glass which is rotated by means of a motor, is provided with incoming and outgoing gas lines in the axis of rotation, and is heated by a double-shelled valve oven (rotary sphere oven). In principle it is also possible as the reactor to employ any heatable mixer which by means of appropriate internals gently moves the pigments composed of B and allows gas to enter and leave. Also suitable for a continuous process regime on the industrial scale, for example, is a rotary tube furnace to which the pigments composed of B and the aluminum alkyl/inert gas mixture are supplied continuously.

Metallic layers A and/or C can, finally, also be applied by wet chemical means through reduction of suitable metal salt solutions. In this way it is possible in particular to deposit relatively noble metals, such as especially silver, copper, gold, cobalt, nickel, palladium and platinum. A series of reducing agents are suitable for this purpose, especially mild organic reducing agents, examples being sugars, such as glucose and dextrose, and also formaldehyde.

In general, however, the metal layers applied by way of the gas phase are preferred over those applied by wet chemical means, owing to their higher quality (more finely crystalline, film-like), since they generally result in brighter pigments of higher color strength.

For the chemical vapor deposition (CVD) of nonselectively absorbing layers B, which consist essentially of lower metal oxides (e.g., $Fe_3O_4$, $VO_2$, $V_2O_3$), preference is given to decomposing metal carbonyls, such as iron pentacarbonyl, or oxychlorides, such as vanadium oxychloride, with steam. If the gas-phase decomposition gives rise first to higher metal oxides, such as $V_2O_5$, these must be subsequently reduced to the desired oxide using, for example, hydrogen or ammonia.

The CVD techniques already described are also particularly suitable for generating selectively absorbing layers B, which consist essentially of colored metal oxides and/or metal nitrides.

The deposition of α-iron(III) oxide, chromium(III) oxide and titanium(III) oxide by oxidative decomposition of iron pentacarbonyl and chromium hexacarbonyl is sufficiently well known from the prior art.

Wet chemically, $α-Fe_2O_3$ and $Cr_2O_3$ layers can be applied by hydrolytic decomposition of iron(III) salts, such as iron (III) chloride and iron(III) sulfate, or chromium(III) chloride, and subsequent conversion of the hydroxide-containing layers formed into the oxide layers by heat treatment.

Coating with selectively absorbing $γ-Fe_2O_3$ (B) can be carried out by known CVD process variants involving first decomposing $Fe(CO)_5$ in the presence of steam to deposit a magnetite film which is subsequently oxidized with air to give $γ-Fe_2O_3$, or by first oxidatively decomposing $Fe(CO)_5$ to deposit an $α-Fe_2O_3$ film which is reduced with hydrogen to form products containing iron(III) and is then oxidized with air to give $γ-Fe_2O_3$.

Vanadium(V) oxide layers B, finally, can be deposited by gas-phase decomposition of vanadium oxychloride with steam.

To prepare colored $TiO_2$ layers, reference may be made to the details in DE-A-44 37 753.

The substrate to be coated in accordance with the invention is preferably mobile and with particular preference is a moving substrate in strip form.

Suitable layer substrates are, preferably, known films formed from polyesters, such as polyethylene terephthalate or polyethylene naphthalate, and also polyolefins, cellulose triacetate, polycarbonates, polyamides, polyimides, polyamidoimides, polysulfones, aramids or aromatic polyamides. The thickness of the layer substrates is preferably from about 5 to 100 µm, in particular from about 10 to 20 µm. The layer substrate can be subjected beforehand to a corona discharge treatment, a plasma treatment, a gentle adhesion treatment, a heat treatment, a dedusting treatment or the like. The layer substrate preferably has a mean center-line surface roughness of 0.03 µm or less, in particular of 0.02 µm or less, and, with particular preference, 0.01 µm or less. It is desirable, moreover, for the substrate to have not only a low mean center-line surface roughness of this kind but also to possess no great projections (raised areas) of 1 µm or more. The roughness profile of the surface of the substrate can be varied by means of fillers which are added to the layer substrate in the course of its production. Examples of suitable fillers are oxides and carbonates of Ca, Si and Ti, and fine organic powders of acrylic substances.

The substrate can also be a metallized foil, a preferably polished metal strip, or a cylinder roll.

B and layers A and C containing organic compounds can be of low or high viscosity, but are preferably of low viscosity, when they are applied to the substrate. For this purpose, the cholesteric mixtures, or the formulations comprising absorption pigment, can be applied to the carrier in undiluted or minimally diluted form at elevated temperature or in highly diluted form at a low temperature. It is particularly preferred to apply the three layers A, B and if desired C wet-on-wet to the carrier in one operation, then to dry them together, if appropriate, and subsequently to subject them to conjoint curing.

For the simultaneous wet-on-wet application of said layers it is particularly preferred if A and/or C comprise absorption pigments or dyes bound in a matrix of the same cholesteric mixture which is also present in B. By this means, possibly disruptive layer boundaries between A, B and C are avoided, giving a homogeneous system comprising pigments distributed homogeneously, or dyes dissolved uniformly, in the central region.

Casting techniques are particularly suitable for the simultaneous application of said layers, especially knife or bar coating processes, cast-film extrusion or stripping processes, and the cascade coating process.

In the case of the knife or bar coating process, the liquid is applied to a substrate through a slot in a casting block, the layer thickness being adjustable by way of a defined knife or bar gap between a roller, over which the carrier is guided, and the lip of the coater. To apply the bottom (first) layer, the first casting block is brought toward the roller; to apply the second layer, a second casting block is brought toward the first casting block and, to apply the third layer, a third casting block is brought against the second. Both or all three liquids run to their respective coating blade or bar and are coated out simultaneously over one another.

In the case of the cast-film extrusion or stripping process, a flexible substrate, such as a film, is guided past the coater head under defined web tension between two rollers. The amounts of liquid appropriate to the desired layer thickness are applied simultaneously to the substrate from three parallel casting slots arranged transverse to the running direction of the web.

In the cascade coating process, the substrate is guided over a roller. The liquids to be applied run over one another from differently arranged slots and then run together onto the substrate.

It is of course also possible first to apply only one cholesteric layer, to subject this layer, if desired, to drying and to curing, and then to apply two layers wet-on-wet to the cured cholesteric layer by means, for example, of one of the abovementioned processes. It is likewise possible to subject each layer to individual and successive application, optional drying and curing.

If casting techniques are employed, the pourable cholesteric mixture preferably has a viscosity in the range from about 10 to 500 mPas, in particular from about 10 to 100 mPas, measured at 23° C. The cholesteric mixture is, with particular preference, applied to the substrate at a rate from about 1 to 800 m/min, in particular from about 5 to 100 m/min. It is preferred to use a casting apparatus whose casting slot width is in the range from about 2 to 50 µm, in particular from about 4 to 15 µm. The cholesteric mixture is preferably applied under elevated pressure, in particular at a coater overpressure in the range from about 0.01 to 0.7 bar, with particular preference from 0.05 to 0.3 bar.

The cured layers can be removed from the substrate, for example, by guiding the substrate over a deflecting roller having a small diameter. As a consequence of this the crosslinked material then peels away from the substrate. Other known methods are equally suitable: for example, the stripping of the substrate over a sharp edge, or by way of an air knife, ultrasound or combinations thereof. The cholesteric material, now devoid of its substrate, is comminuted to a desired particle size. This can be done, for example, by grinding in universal mills. In order to narrow the particle size distribution the comminuted pigments can subsequently be classified by means, for example, of a sieving process.

The invention additionally provides compositions comprising pigments of the invention.

Particularly preferred compositions of the invention are coating materials, such as paints and varnishes, which comprise not only the pigments of the invention but also one or more substances selected from waterborne coatings, for example in the form of aqueous dispersions, such as PMA, SA, polyvinyl derivatives, PVC, polyvinylidene chloride, SB copolymer, PV-AC copolymer resins, or in the form of water-soluble binders, such as shellac, maleic resins, rosin-modified phenolic resins, linear and branched, saturated polyesters, amino resin-crosslinking saturated polyesters, fatty acid-modified alkyd resins, plasticized urea resins, or in the form of water-thinnable binders, such as PU dispersions, EP resins, urea resins, melamine resins, phenolic resins, alkyd resins, alkyd resin emulsions, silicone resin emulsions; powder coatings, such as powder coatings for TRIBO/ES, such as polyester coating powder resins, PU coating powder resins, EP coating powder resins, EP/SP hybrid coating powder resins, PMA coating powder resins, or powder coatings for fluidized-bed sintering, such as thermoplasticized EPS, LD-PE, LLD-PE, HD-PE; solventborne coatings, such as one- and two-component coating materials (binders) examples being shellac, rosin esters, maleate resins, nitrocelluloses, rosin-modified phenolic resins, physically drying saturated polyesters, amino resin-crosslinking saturated polyesters, isocyanate-crosslinking saturated polyesters, self-crosslinking saturated polyesters, alkyds with saturated fatty acids, linseed oil alkyd resins, soya oil resins, sunflower oil alkyd resins, safflower oil alkyd resins, ricinene alkyd resins, tung oil/linseed oil alkyd resins, mixed-oil alkyd resins, resin-modified alkyd resins, styrene/vinyltoluene-modified alkyd resins, acrylicized alkyd resins, urethane-modified alkyd resins, silicone-modified alkyd resins, epoxy-modified alkyd resins, isophthalic acid alkyd resins, unplasticized urea resins, plasticized urea resins, melamine resins, polyvinyl acetals, non-crosslinking P(M)A homo- or copolymers, noncrosslinking P(M)A homo- or copolymers with nonacrylic monomers, self-crosslinking P(M)A homo- or copolymers, P(M)A copolymers with other nonacrylic monomers, externally crosslinking P(M)A homo- or copolymers, externally crosslinking P(M)A copolymers with nonacrylic monomers, acrylate copolymer resins, unsaturated hydrocarbon resins, organic-soluble cellulose compounds, silicone combination resins, PU resins, P resins, peroxide-curing unsaturated synthetic resins, radiation-curing synthetic resins, both photoinitiator-containing and photoinitiator-free radiation-curing synthetic resins; solvent-free coating materials (binders) such as isocyanate-crosslinking saturated polyesters, two-pack PU resin systems, moisture-curing 1-component PU resin systems, EP resins, and also synthetic resins—individually or in combination—such as acrylonitrile-butadiene-styrene-copolymers, BS, cellulose acetate, cellulose acetobutyrate, cellulose acetopropionate cellulose nitrate, cellulose propionate, artificial horn, epoxy resins, polyamide, polycarbonate, polyethylene, polybutylene terephthalate, polyethylene terephthalate, polymethyl methacrylate, polypropylene, polystyrene, polytetrafluoroethylene, polyvinyl chloride, polyvinylidene chloride, polyurethane, styrene-acrylonitrile copolymers, or unsaturated polyester resins in the form of granules, powders or casting resin.

The compositions of the invention may additionally comprise stabilizers to counter the effects of UV and weather, and also inorganic or organic pigments, as described above.

The pigments of the invention can be incorporated individually or in mixtures into the compositions of the invention where they may if desired be subjected to additional alignment by methods which initiate shear forces. Suitable methods of aligning the pigments of the invention are printing and knife coating or, in the case of magnetic pigments, applying an external magnetic field.

The present invention additionally provides coating materials comprising at least one multilayer pigment of the invention, preferably coating materials selected from effect paints, effect inks or effect films, and especially from self-opacifying effect paints, inks or films.

The present invention also provides for the use of the pigments of the invention for coloring plastics or films in the vehicle and vehicle accessories sector, in the leisure, sport and games sector, in decorative cosmetics, in the textile, leather or jewelry field, in the gift product field, in writing utensils, packaging or spectacle frames, in the construction sector, in the household sector and in connection with printed products of all kinds, such as cardboard packaging, other packaging materials, carrier bags, papers or labels.

The color effects which can be achieved by means of the cholesteric pigments of the invention embrace—owing to the host of achievable reflection wavelengths—the UV and IR region as well as, of course, the region of visible light. If the pigments of the invention are applied to or incorporated into bank notes, check cards, other cashless means of payment or ID (by means, for example, of known printing techniques), this considerably hinders the identical copying, and especially the counterfeiting, of these articles. The present invention therefore additionally provides for the use of the pigments of the invention for the anticounterfeiting treatment of articles, especially bank notes, check cards or other cashless means of payment or ID.

Also provided for by the present invention is the use of the compositions of the invention for coating articles of utility and for painting vehicles.

The invention will now be elucidated further on the basis of the following practical examples and with reference to the attached figure, wherein FIG. 1: shows the diagrammatic representation of a coating apparatus which may be used in accordance with the invention.

EXAMPLE

Preparation of a Semitransparent Cholesteric Effect Pigment a) Preparing the Cholesteric Layer The cholesteric layer was prepared by the casting method described in DE 197 38 369.6 or PCT/EP 98/05544, which are expressly incorporated herein by reference.

Use was made of a cholesteric mixture of the above-described group b) comprising as chiral monomer a compound of the formula 2 indicated above and as achiral, nematic monomer a mixture of compounds of the formula 3 indicated above. The undiluted cholesteric mixture contained 90.5% by weight of the achiral, nematic compound, 6.5% by weight of the chiral compound and, as photoinitiator, 3% by weight of 1-hydroxycyclohexyl phenyl ketone, which is marketed under the designation Irgacure 184. The cholesteric mixture was diluted with methyl ethyl ketone to a solids content of 50% by weight, based on the overall weight of the coating composition. 0.1% by weight of Byk 361 was added as leveling agent.

Coating was carried out with a coating apparatus which is shown diagrammatically in FIG. 1. A polyethylene terephthalate film (PET film) (G) having a thickness of 15 µm was unrolled continuously from the film winder (F) and coated using a knife coater. The coating overpressure was approximately 0.2 bar. Drying took place in the dryer (C) at 60° C. The residence time in the dryer was 12 seconds. The layer was cured by UV fixing in the UV unit (A), while the dried strip was passed over the cooling roll (B). The cured cholesteric layer was wound up on the roller (D). The thickness of the dry cholesteric layer was 2.1 µm.

b) Applying the Absorbing Layer

For application to the cholesteric layer obtained in accordance with stage a), a coating composition of the following makeup was prepared:

In a laboratory kneading apparatus having a useful volume of 300 ml, 150 g of pigment-grade carbon black Regal 400R (Cabot Corporation) were kneaded with 3 g of stearic acid, 80 g of a phosphorus dispersing resin (Disperdur phosphonate; K value=22; $M_w$=11,000) at 50% in tetrahydrofuran, described in DE-A-195 16 784, and 40 g of methyl ethyl ketone for 1 hour. The resultant kneading compound was subsequently adjusted to a solids content of 25% with methyl ethyl ketone in a dissolver. This dispersion was subsequently fully dispersed to its optimum in a stirred mill (type: Dispermat SL, milling chamber volume 125 ml, grinding media zirconium oxide 1–1.25 mm). The progress of dispersion was monitored by means of an interference contrast technique (EP-B-0 032 710). End fineness was achieved when the surface to be tested was free from agglomerates. Into this fully finely disperse mixture there were incorporated, intensively, different amounts of a co-binder, in four portions, using a dissolver. The co-binder used was a sulfonate polyurethane (Morthane CA 152, K value=48; $M_w$=20,000; from Morton International).

Based on parts by weight of carbon black, the following total binder fractions (sum of Disperdur phosphonate and Morthane CA 152) were formulated in the four batches:

| Batch | Carbon black: total binder |
|-------|----------------------------|
| 1 | 1:2 |
| 2 | 1:3 |
| 3 | 1:4 |
| 4 | 1:5 |

These differently modified carbon black dispersions were applied in a film thickness of 0.6±0.1 µm to the cholesteric layer. Apart from the UV curing, which is not necessary here, the coating process corresponded to that of stage a).

c) Removing the Layer Assembly from the Substrate Film

The two-layer assembly obtained from stage b) was removed from the substrate film by slitting the assembly transversely to the film web direction, using a razor blade, and then blasting it with compressed air from a slot die. The coated film was guided continuously past the slot die and the assembly removed by blasting was collected in the form of flakes.

d) Grinding the Flakes to a Pigment 10 g of cholesteric flakes, prepared as described under c), were mixed with 100 g of sodium chloride and milled 6 times for 2 minutes in an impact cutter mill. After grinding, the salt was washed out with water and the pigment was isolated. The thickness of the pigments obtained was approximately 2.7 µm at an average diameter of approximately 25 µm.

e) Mechanical Properties of the Layer Assembly and of the Pigments

For the four batches above, the following parameters were investigated:

(1) Adhesion of the absorption layer to the cholesteric layer (2) Layer detachment from the substrate (3) Delamination tendency on pigment grinding The results are summarized in the table below:

| Batch | Adhesion of absorption layer to LC layer | Layer detachment from the substrate | Delamination tendency absorber layer on LC layer on grinding |
|-------|------------------------------------------|--------------------------------------|---------------------------------------------------------------|
| 1 | 7 cN | good | great |
| 2 | 8 cN | good | moderate |
| 3 | 20 cN | good | none |
| 4 | 22 cN | good | none |

The adhesive force was determined as follows:

A section of adhesive tape approximately 5 cm in length was affixed to a flat metal plate. The adhesive tape used may be any commercially customary adhesive tape which together with a PET reference film gives an adhesive force under otherwise identical measurement conditions of from about 7.3 to 7.9 cN, in particular about 7.6 cN. The PET reference film used here is a PET film, type E2R, from Teijin, thickness 9 µm, width 6.35 mm, surface roughness according to DIN 4768: Rz=0.86 µm, according to DIN 4786/1: Ra=0.012 μm, in accordance with EP-B-0 032 710 (interference contrast technique): 75 to 125 nm. The adhesive layer faces upward and away from the plate. A sample (length about 10 cm, width 6.35 mm) is cut out from the cured layer assembly still adhering to the substrate film. The assembly to be measured, consisting of the layer substrate and the two-layer assembly, is applied so that the absorption layer comes into contact with the adhesive layer. The free end of the assembly stuck on is then bent so that it forms an angle of 160° with the plane of the metal plate. At a constant rate of 0.1 mm per second, the free end of the strip is then pulled against the stuck-on end of the strip, with a continual increase in the tensile force in the tape until the layer assembly tears. In the subsequent course of the measurement, the adhesive strength between cholesteric layer and absorption layer is measured. The tensile stresses in the tape are detected with a high-resolution sensor and recorded as the peel force in cN using a y-T plotter.

We claim:

1. A platelet-shaped cholesteric multilayer pigment which comprises the layer sequence A/B/ and if desired C, where A and C independently of one another are at least one partly light-permeable absorption layer, and B is at least one cholesteric layer; and the adhesive force between the cholesteric layer and the absorption layer is more than about 8 cN.

2. A multilayer pigment as claimed in claim 1, where A and/or C comprise at least one organic or inorganic absorption pigment or an absorption dye, if desired in an organic or inorganic binder matrix.

3. A multilayer pigment as claimed in claim 1, where A and/or C comprise an absorbing polymer layer.

4. A multilayer pigment as claimed in claim 1, where A and/or C comprise at least one essentially inorganic absorption layer.

5. A multilayer pigment as claimed in claim 1, where the thickness of each individual cholesteric layer of B is from 0.5 to 20 μm.

6. A multilayer pigment as claimed in claim 1, where the thickness of each individual layer of A and/or C is from 1 nm to 5 μm.

7. A multilayer pigment as claimed in claim 1, whose diameter is from 3 to 500 μm.

8. A multilayer pigment as claimed in claim 1 having a total layer thickness of less than 3 μm.

9. A multilayer pigment as claimed in claim 1, where B comprises cholesteric mixtures selected from the group consisting of a) at least one cholesteric, polymerizable monomer;

b) at least one achiral, nematic, polymerizable monomer and one chiral compound;

c) at least one cholesteric, crosslinkable polymer;

d) a cholesteric polymer in a polymerizable diluent; and e) at least one cholesteric polymer whose cholesteric phase can be frozen in by rapid cooling to below the glass transition temperature, in the cured state.

10. A multilayer pigment as claimed in claim 1, where A and/or C comprise a binder matrix comprising at least one cholesteric mixture selected from the group consisting of a) at least one cholesteric, polymerizable monomer;

b) at least one achiral, nematic, polymerizable monomer and one chiral compound;

c) at least one cholesteric, crosslinkable polymer;

d) a cholesteric polymer in a polymerizable diluent; and e) at least one cholesteric polymer whose cholesteric phase can be frozen in by rapid cooling to below the glass transition temperature, in the cured state.

11. A multilayer pigment as claimed in claim 10, where A, B and if desired C comprise the same cholesteric mixtures.

12. A multilayer pigment as claimed in claim 1 where A and/or C are magnetic.

13. A multilayer pigment as claimed in claim 1, where A and/or C and, if desired, B additionally comprise stabilizers to counter the effects of UV and weathering.

14. A process for producing a multilayer pigment as claimed in claim 1, which comprises applying the layers A, B and if desired C atop one another to a substrate, simultaneously or with a time differential, curing the layers, again simultaneously or with a time differential, removing the layers together from the substrate and then comminuting them to give multilayer pigments.

15. A platelet-shaped cholesteric multilayer pigment, which comprises at least one cholesteric layer B enveloped by an at least partly light-permeable absorption layer A, where A comprises at least one essentially inorganic absorption layer and where the individual thickness of each individual cholesteric layer of B is from 0.5 to 20 μm.

16. A process for preparing a multilayer pigment as claimed in claim 15, which comprises first applying layer B to a substrate, curing it, removing the cured layer from the substrate and comminuting it to form pigments, and then applying the layer A to the pigments.

17. A composition comprising at least one multilayer pigment as claimed in claim 1.

18. A coating material comprising at least one multilayer pigment claim 1.

19. The use of a multilayer pigment as claimed in claim 1 in the vehicle and vehicle accessories sector, in the EDP, leisure, sport and games sector, as an optical component such as a polarizer or filter, in the cosmetics field, in the textile, leather or jewelry field, in the gift product field, in writing utensils or on spectacle frames, in the construction sector, in the domestic sector or in connection with a printed product of any kind, for preparing an ink or paint or for the anticounterfeiting treatment of an article.

20. The use of a composition as claimed in claim 17 for coating an article of utility or for painting a vehicle.

21. The platelet-shaped cholesteric multilayer pigment of claim 15, wherein the thickness of A is from 1 nm to 5 μm.

22. The platelet-shaped cholesteric multilayer pigment of claim 15, wherein B comprises cholesteric mixtures selected from the group consisting of a) at least one cholesteric, polymerizable monomer;

b) at least one achiral, nematic, polymerizable monomer and one chiral compound;

c) at least one cholesteric, crosslinkable polymer;

d) a cholesteric polymer in a polymerizable diluent; and e) at least one cholesteric polymer whose cholesteric phase can be frozen in by rapid cooling to below the glass transition temperature, in the cured state.

* * * * *